3,369,486
TRAINING HAND GRENADE

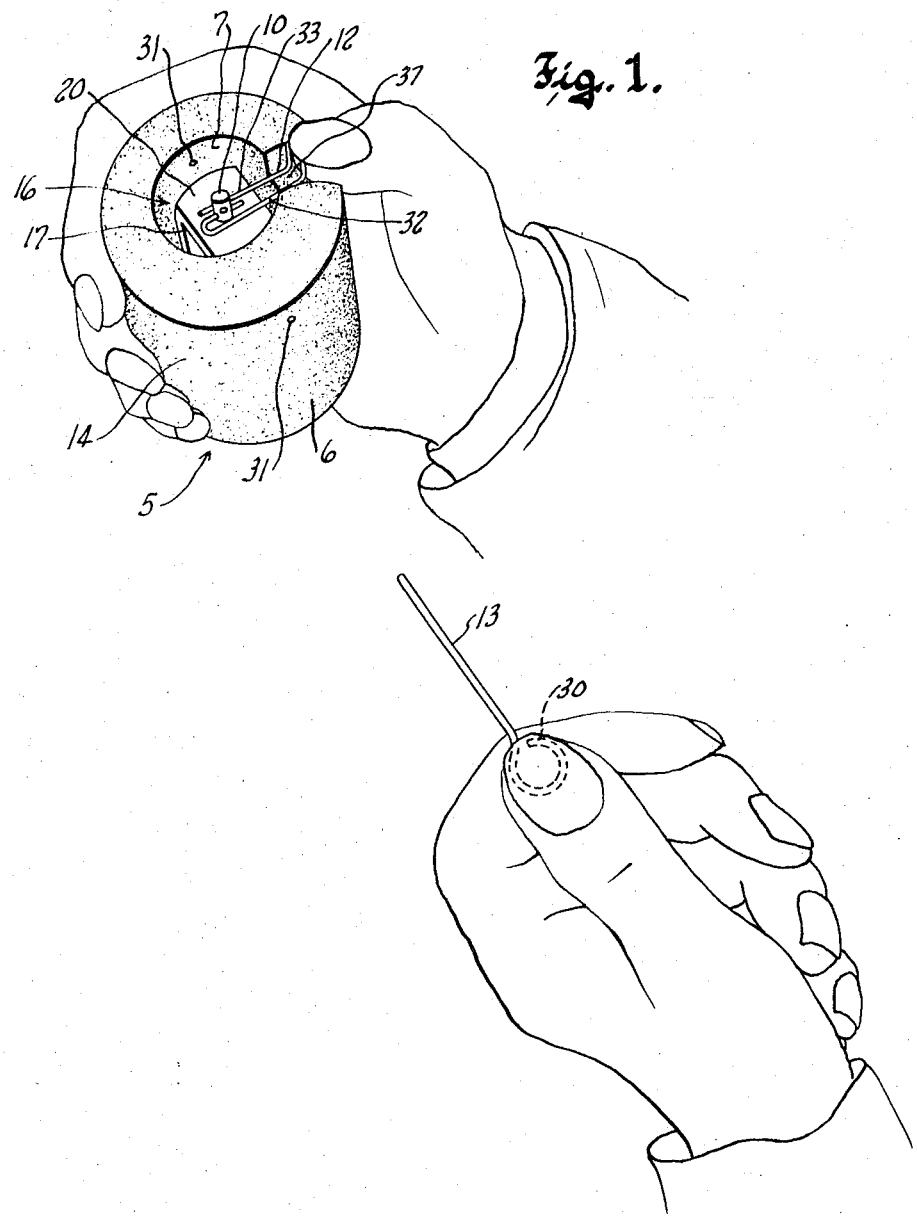

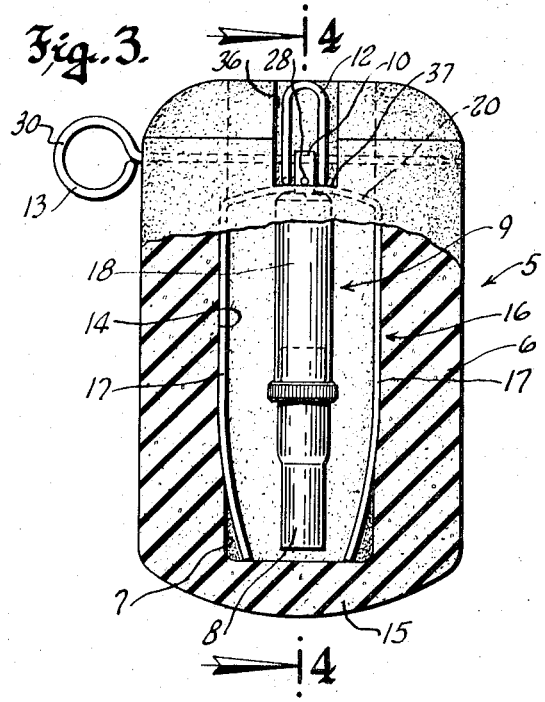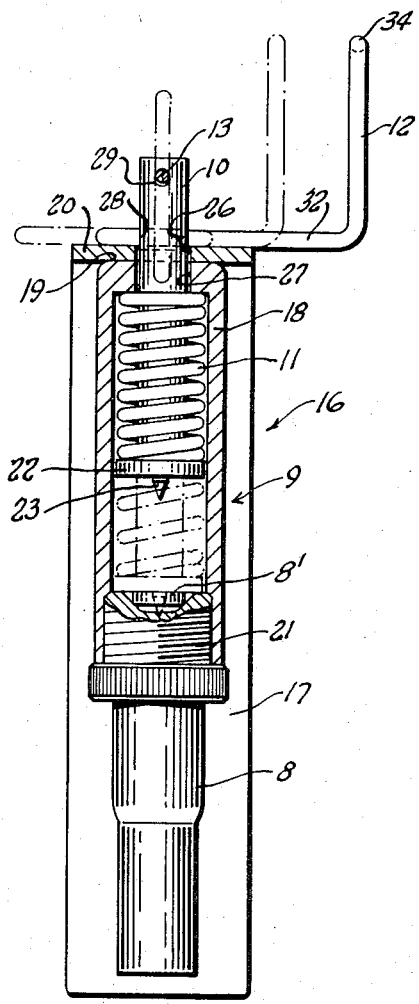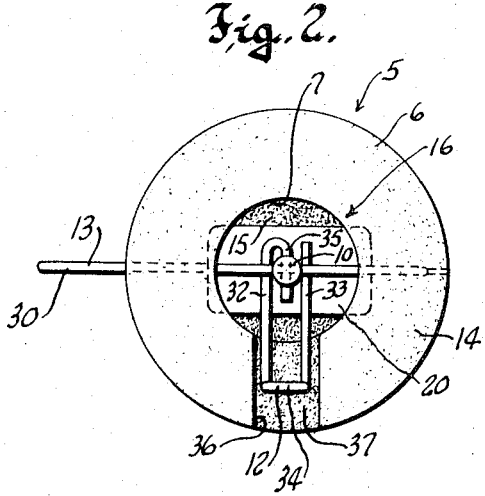

Ander Karl Holger Wrennstad and Bror Teofild Kluft, Halmstad, Sweden, assignors to Saab Aktiebolag, Linkoping, Sweden, a corporation of Sweden
Filed July 12, 1966, Ser. No. 564,609
Claims priority, application Sweden, July 19, 1965, 9,505/65
7 Claims. (Cl. 102—64)

This invention relates to military training equipment and more particularly to a training hand grenade which can be used by troops engaged in simultated combat exercises with very realistic effects but without danger to pesonnel.

Various types of training hand grenades have heretofore been known, but none of them has been completely satisfactory. For example, one type of training hand grenade heretofore commonly used in two-sided combat exercises has been made of cloth filled with padding; but such training devices obviously did not have satisfactorily realistic resemblance to actual hand grenades containing live ammunition, especially since they did not have a locking and release device and had no indicating load that suggested bursting and the effects of bursting.

Also known are training hand grenades having a sheet metal shell and a wooden handle, and others having a body of cast iron, both provded with indicating loads; but such devces are obviously limited in their use to maneuvers directed against dummies and other inanimate targets since they would endanger personnel if employed in two-sided battle practice manuevers.

The present invention, by contrast, has for its object the provision of a training hand grenade which can be used in two-sided battle practice, against live troops playing the role of an enemy, and which, although presenting no danger to personnel, corresponds both in shape and in manner of use to a hand grenade loaded with live ammunition and, moreover, has a combustible cartridge which provides a realistic but harmless indicating flash strongly suggesting the bursting of a live ammunition hand grenade.

Another object of this invention is to provide a training hand grenade having a body of soft, spongy material, so that a person hit by it will not be harmed, and which has a combustible cartridge to provide an indicating flash, which cartridge is so located in a cavity in the body that its explosion cannot injure a person hit by the device, even if the simulated burst occurs near his eyes.

A further object of this invention is to provide a training hand grenade of the character described having a body which is made of soft, spongy material so as to be harmless to a person hit by the device, but which material has no tendency to absorb water even during a long period of exposure to it. The significance of this last stated object is that a body of a materal which is soft and spongy, and which is in itself normally harmless to a person hit by it, can nevertheless, if it absorbs a substantial amount of water and is then subjected to a drop in temperature below the freezing point, effectively become an ice lump that can cause substantial harm to a person at whom it is thrown.

It follows that it is another object of this invention to provide a very versatile and realistic training hand grenade which is useful not only in all types of troop training exercises, including two-sided battle practice, but which is also useful under substantially all weather and climatic conditions.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 1 is a top perspective view of a training hand grenade embodying the principles of this invention, with its safety pin shown in disassembled relation to the grenade itself, and illustrating how the releaser can be actuated after the safety pin is removed;

FIGURE 2 is a top plan view of the training hand grenade of this invention;

FIGURE 3 is a view partly in side elevation and partly in longitudinal section of the training hand grenade; and FIGURE 4 is a sectional view on an enlarged scale, taken on the plane of the line 4—4 in FIGURE 3 but with the body of the training hand grenade omitted.

Referring now more particularly to the accompanying drawings, the numeral 5 desgnates generally a training hand grenade of this invention which comprises, in general, a body or shell 6 of soft, foam-like material shaped to have the general external appearance of an actual live ammunition hand grenade and having a bore 7 therein, a combustible cartridge 8 coaxially seated deep in the bore 7 and having an igniter 8' in one end portion thereof, and a detonator 9 in the bore comprising a coaxial firing pin 10 that is biased inwardly toward the cartridge by means of a compression spring 11. Normally a releaser 12 and a safety pin 13 hold the firing pin 10 against the bias of its spring 11 in a position spaced from the cartridge 8. The releaser and the safety pin are individually effective to lock the firing pin in said position, so that the firing pin cannot be released to ignite the cartridge until the safety pin is withdrawn and the releaser is actuated.

The body or shell 6 of the training hand grenade is generally tubular, with a very thick side wall 14, although one end of the bore 7 in the body is preferably closed by a bottom wall portion 15 which is integral with the side wall portions of the body and is made of the same soft, foam-like material. Hence the bore 7 can be regarded as a deep cavity in the body, in the bottom portion of which the cartridge 8 is seated.

The material of the body or shell is, generally speaking, a foam rubber substance which has substantially the following composition for a quantity of 16,290 grams: 10,000 gr. India rubber, 2,500 gr. chalk, 500 gr. zinc white, 300 gr. sulfur, 600 gr. stearine, 200 gr. paraffin, 500 gr. aniline color, 400 gr. Porofor or similar foaming agent, 10 gr. rubber aging protection or the like, 80 gr. of a rubber compounding chemical on the order of vulcazite DM, and 1,200 gr. spindle oil. These quantities by weight are approximate in that they can be varied within about a five to ten percent range.

The detonator 9 and cartridge 8 are supported in the bore 7 in the body by means of a generally U-shaped supporting member 16 of substantially springy metal such as spring steel. The legs 17 of the supporting member are long enough to extend along most of the bore, and they engage opposite bore surfaces under flexing outward bias to thereby hold the U-shaped member against displacement axially out of the bore and also to afford a substantial amount of form retaining support to the soft, foam-like body. The supporting member 16 is disposed in the bore with its bight portion 20 remote from the bottom end wall 15 of the body.

The detonator 9 is housed in an elongated generally tubular sleeve 18 which is disposed between the legs of the U-shaped member and extends lengthwise parallel to them. An upper end wall 19 on the sleeve underlies the bight portion 20 of the U-shaped member and is secured thereto to hold the sleeve in the position just described. The combustible cartridge 8, with its igniter 8' uppermost, is coaxially secured to the lower end of the sleeve, as by means of cooperating threads 21 in the sleeve and on the upper end portion of the cartridge.

The firing pin 10, which has a uniform diameter along most of its length, is surrounded by the compression spring 11, which is located entirely within the sleeve 18. The upper end of the spring 11 bears against the underside of the end wall 19 of the sleeve, while its lower end is seated on a radially projecting circumferential flange 22 on the firing pin near the lower end thereof, so that the spring urges the firing pin downwardly toward percussive engagement of a pointed hammer 23 on the firing pin against the igniter 8'.

Normally, of course, the firing pin is held in its position illustrated in FIGURE 4, with its hammer 23 spaced from the igniter, the spring 11 compressively loaded, and the upper end portion of the firing pin projecting upwardly beyond the bight portion 20 of the U-shaped supporting member through aligned holes 26 and 27 in said bight portion and in the end wall 19 of the sleeve.

In the projecting upper end portion of the firing pin there are a pair of axially spaced apart holes 28 and 29 which have their axes transverse to that of the firing pin and at right angles to one another, and in which the releaser 13 and the safety pin 12, respectively, are normally engaged.

Normally the safety pin 13, which is a straight length of wire having a loop 30 formed on one end thereof, extends through the upper hole 28 in the firing pin and through aligned holes 31 in the body. Should the releaser be inadvertently disengaged from the firing pin, the safety pin will of course hold the firing pin against spring biased propulsion toward the igniter.

The releaser 12 can be formed from a single piece of stiff wire bent to a U-shape, with elongated legs 32 and 33 and a bight portion 34 that lies in a plane perpendicular to that containing the legs 32 and 33. One leg 33 of the releaser is bent back upon itself to provide a reentrant portion 35 which lies between the legs and parallel to them, and which is normally engaged in the lower hole 29 in the firing pin. The legs 32 and 33 of the releaser overlie the bight portion 20 of the supporting member and cooperate with it in holding the firing pin in its normal position.

The body 6 is formed with a groove or channel 36 in the top thereof, opening radially from the bore 7 to one side of the body, which cannel is of such width that the bight portion 34 of the releaser has a fairly close but easily slideable fit therein. The bottom surface 37 of this channel is substantially coplanar with the upper surface of the bight portion 20 of the supporting member. With the bight portion of the releaser disposed in this channel, the releaser is protected against inadvertent disengagement from the firing pin but is nevertheless readily accessible for radially inward depression by the thumb as illustrated in FIGURE 1. Such manipulation of the releaser of course disengages its reentrant portion 35 from the firing pin, and, if the safety pin has been withdrawn, releases the firing pin for spring propelled percussive engagement against the igniter 8'.

The cartridge is constructed and arranged in a known manner to produce a readily visible flash after a predetermined delay of three to four seconds following release of the firing pin. Because the cartridge is deep in the cavity 7 in the body, and its explosive shock is absorbed by the soft, spongy material of the body, the flash that it produces is harmless to personnel.

In assembling the training hand grenade of this invention, the sleeve 18 is first secured to the U-shaped supporting member. The firing pin, with the spring 11 surrounding it, is inserted into the sleeve from the bottom thereof, and the firing pin is moved upwardly against the bias of the spring, with the aid of a rod, nail or the like, until its upper end projects sufficiently far above the bight portion 20 of the supporting member to exposes the lower hole 29. The reentrant portion 35 of the releaser is then inserted into the lower hole 29, after which the firing pin will be held in its normal position by the engagement of the releaser with the bight of the U-shaped member. Next the cartridge 8 is screwed to the lower end of the sleeve, and the resultant subassembly is inserted axially into the bore 7 in the body until the lower ends of the legs 17 of the U-shaped member engage the bottom wall 15 of the body. Finally, the safety pin is inserted through the aligned holes 28 and 31. Proper rotational positioning of the firing pin so that its hole 29 aligns with the holes 31 in the body is insured during insertion of the detonator subassembly into the body when the releaser is received in the slot or channel 36.

From the foregoing description taken together with the accompanying drawings it will be apparent that this invention provides a very realistic and versatile training hand grenade which can be used very effectively in military training against both actual troops playing the role of an enemy and inanimate targets, and that the device of this invention produces a flash which realistically simulates the burst of an actual hand grenade but is nevertheless harmless to personnel against whom it is thrown or near whom it is detonated.

What is claimed as our invention is:

1. A training hand grenade of the character described, comprising:
   A. a body having substantially thick wall portions of soft spongy material defining an elongated bore;
   B. means for producing an identifying flash comprising
      (1) a combustible cartridge having an igniter, and
      (2) a firing pin biased toward the cartridge; and
   C. substantially rigid means for supporting the cartridge and the firing pin in coaxial relationship in the bore in the body, said supporting means having portions engaging opposite surfaces of the bore, along a substantial portion of the length thereof, under radially outward bias to afford form retaining support to the body and to confine the flash producing means against axial displacement out of the bore.

2. The training hand grenade of claim 1 further characterized by the wall portions of the body being made of material having the following relative composition by weight to within about 10% of each of the quantities indicated:
   10,000 grams India rubber, 2,500 grams chalk, 500 grams zinc-white, 300 grams sulfur, 600 grams stearine, 200 grams paraffin, 500 grams aniline color, 400 grams of foaming agent on the order of Porofor, 10 grams of a rubber aging protection, 80 grams of a rubber compounding chemical on the order of vulcazite DM, and 1,200 grams spindle oil.

3. The training hand grenade of claim 1 further characterized by:
   a safety pin extending tranversely to the firing pin through normally aligned holes in the firing pin and in the body and having a portion accessible at one side of the body to be grasped for withdrawal from said holes.

4. The training hand grenade of claim 1 further characterized by:
   A. said supporting means comprising a U-shaped member, the legs of which comprise said designated portions that engage said bore surfaces and the bight portion of which has a hole therein through which an outer end portion of the firing pin extends, the remainder of the firing pin being disposed between said legs and in parallel relationship to them;

B. means supporting the cartridge from the bight portion of the supporting member, between the legs thereof and spaced from said bight portion; and C. a releaser readily detachably connected to said outer end portion of the firing pin and bearing against said bight portion of the supporting member to hold the firing pin against its bias.

5. The training hand grenade of claim 4 further characterized by:

the releaser comprising a U-shaped length of wire having its bight portion disposed in a plane normal to the plane of its legs and having a reentrant portion comprising an extension of one of its legs which is between and parallel to them and is normally engaged in a transverse hole in the firing pin.

6. The training hand grenade of claim 5, further characterized by:

said body having an open channel through a bore defining wall portion, at one end thereof, in which the bight portion of the releaser is slideable and through which it is accessible for manipulation.

7. A training hand grenade of the character described comprising:

A. a substantially U-shaped supporting member of stiff but flexible material having elongated legs and a hole through its bight portion;

B. a sleeve secured at one end to the bight portion of the supporting member and disposed between and substantially parallel to the legs thereof;

C. a combustible cartridge secured to the other end portion of the sleeve and adapted to be percussively ignited;

D. a firing pin coaxially slideable in the sleeve, said firing pin having (1) an outer end portion which normally projects beyond the sleeve through said hole in the bight portion of the supporting member, (2) means near its inner end providing a shoulder which faces axially toward its outer end, and (3) a hammer at its inner end which is percussively engageable with the combustible cartridge;

E. a coiled compression spring coaxially embracing the firing pin and reacting between said shoulder thereon and the bight portion of the supporting member to bias the firing pin toward the cartridge;

F. means releasably engaged with the outer end portion of the firing pin and bearing against the bight portion of the supporting member to hold the firing pin against the bias of said spring with the hammer in normally spaced relation to the cartridge; and G. a body of substantially soft spongy material having substantially thick wall portions defining a cavity in which the supporting member is received with its legs engaging opposite side surfaces of the cavity under divergent flexing bias to be thus held against displacement out of the cavity.

References Cited

FOREIGN PATENTS 904,287  10/1962  Great Britain.

OTHER REFERENCES

Ammunition, General; Dept. of Army; TM 9–1900; June 1956; pp. 104–107; copy in group 221.

BENJAMIN A. BORCHELT, *Primary Examiner.*

R. F. STAHL, *Assistant Examiner.*